United States Patent [19]

Kessel et al.

[11] Patent Number: 5,409,773

[45] Date of Patent: Apr. 25, 1995

[54] SILICONE RELEASE COMPOSITION

[75] Inventors: Carl R. Kessel; Maureen C. Nelson, both of St. Paul, Minn.

[73] Assignee: Minnesota Mining and Manufacturing Company, St. Paul, Minn.

[21] Appl. No.: 189,518

[22] Filed: Jan. 31, 1994

Related U.S. Application Data

[63] Continuation of Ser. No. 861,647, Apr. 1, 1992, Pat. No. 5,332,797.

[51] Int. Cl.$^6$ ................................................ B32B 7/12
[52] U.S. Cl. ................................... 428/352; 428/354; 428/355; 428/447; 428/451
[58] Field of Search ................. 428/40, 352, 354, 355, 428/447, 451

[56] References Cited

U.S. PATENT DOCUMENTS

| | | | |
|---|---|---|---|
| 3,677,995 | 7/1972 | Earing | 523/427 |
| 4,032,673 | 6/1977 | Schroeter et al. | 427/54 |
| 4,279,717 | 7/1981 | Eckberg et al. | 204/159.13 |
| 4,313,988 | 2/1982 | Koshar et al. | 428/40 |
| 4,822,687 | 4/1989 | Kessel et al. | 428/447 |
| 4,902,739 | 2/1990 | Ona et al. | 524/588 |
| 5,158,991 | 10/1992 | Riding | 522/170 |

FOREIGN PATENT DOCUMENTS

| | | |
|---|---|---|
| 0159568 | 10/1985 | European Pat. Off. . |
| 0449027 | 10/1991 | European Pat. Off. . |
| 0473995 | 3/1992 | European Pat. Off. . |
| 0482480 | 4/1992 | European Pat. Off. . |
| 0484119 | 5/1992 | European Pat. Off. . |

*Primary Examiner*—D. S. Nakarani
*Attorney, Agent, or Firm*—Gary L. Griswold; Walter N. Kirn; Robert W. Sprague

[57] ABSTRACT

A composite structure comprising a substrate bearing a layer of release coating prepared from one or more epoxypolysiloxanes together providing cycloaliphatic epoxy group(s) and non-cycloaliphatic (i.e., linear or branched aliphatic) epoxy group(s). The resulting release coating cures quickly and exhibits low release levels to adhesives. An oligomeric epoxypolysiloxane comprising both cycloaliphatic and non-cycloaliphatic epoxy groups is also disclosed.

14 Claims, No Drawings

SILICONE RELEASE COMPOSITION

This is a continuation of application Ser. No. 07/861,647 filed Apr. 1, 1992, and now issued as U.S. Pat. No. 5,332,797.

FIELD OF INVENTION

This invention relates to composite structures comprising a layer of epoxypolysiloxane which is useful as release coatings for adhesive roll and sheet materials. This invention also relates to oligomeric epoxypolysiloxanes useful for preparing such composite structures.

BACKGROUND OF THE INVENTION

Coatings having specific release properties toward adhesives are widely used. Epoxypolysiloxanes have been found to provide useful release compositions as described in, for example, U.S. Pat. Nos. 4,279,719, 4,313,988 and, 4,822,687. These patents disclose release compositions prepared from a variety of polysiloxanes containing either cycloaliphatic epoxy groups or linear or branched aliphatic epoxy groups. It has been found that use of a polysiloxane containing only cycloaliphatic epoxy groups provides a release composition often exhibiting higher than desired release values to adhesives. Even where a relatively high release value is desired, such may be difficult to attain using epoxypolysiloxanes containing only cycloaliphatic epoxy functionality, since the inclusion of cycloaliphatic epoxy functionality at greater than 20% of the siloxane units in an epoxypolysiloxane generally leads to unacceptably high release values, and high cycloaliphatic epoxy functionality may result in compositions which gel uncontrollably before the release material can be coated onto the desired substrate. On the other hand, use of a polysiloxane containing only linear or branched aliphatic epoxy groups provides suitable release compositions exhibiting release values which can range from low values to relatively high values as desired depending on the content of the epoxy functionality. These compositions show other desirable properties as well such as improved coatability onto and anchorage to substrates. However, such epoxypolysiloxanes generally exhibit a cure rate slower than that exhibited by epoxypolysiloxanes containing only cycloaliphatic epoxy groups. This may render the manufacture of such release materials more expensive and less convenient.

SUMMARY OF THE INVENTION

The present invention provides a novel composite structure comprising a substrate bearing on one or more surfaces a layer comprising the reaction product of a starting material comprising one or more epoxypolysiloxanes individually or together providing cycloaliphatic and non-cycloaliphatic epoxy groups in a total number which is about ! 5 to 50% of the total number of siloxane units, the ratio of total number of cycloaliphatic epoxy groups to total number of non-cycloaliphatic epoxy groups being from about 1:10 to 2:1, the epoxypolysiloxane(s) being cured in the presence of a catalytically effective amount of a cationic epoxy curing catalyst.

The present invention also provides a novel composite structure comprising a substrate bearing on a surface thereof a first layer comprising the reaction product of a starting material comprising one or more epoxypolysiloxanes individually or together providing cycloaliphatic and non-cycloaliphatic epoxy groups in a total number which is about 5 to 50% of the total number of siloxane units, the first layer being cured in the presence of a catalytically effective amount of a cationic epoxy curing catalyst, the surface of the first layer opposite the substrate further having in contact therewith a second layer comprising an adhesive, the first layer curing faster than if the starting material comprised none of the cycloaliphatic epoxy groups, and the first layer exhibiting a lower release value to the second layer than if the starting material comprised none of the non-cycloaliphatic epoxy groups.

The present invention still further provides a novel oligomeric mixed epoxypolysiloxane of Formula I

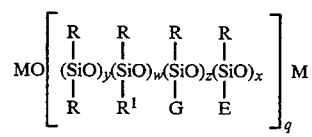

wherein
R is a lower alkyl group having one to three carbon atoms,
$R^1$ is a monovalent hydrocarbon group of 4 to 20 carbon atoms,
E is a monovalent linear or branched aliphatic epoxy group;
G is a monovalent cycloaliphatic epoxy group;
M is a silyl group selected from $R_3Si-$, $R_2R^1Si-$, $RR^1{}_2Si-$, $R^1{}_3Si-$, $R_2ESi-$, $RE_2Si-$, $E_3Si-$, $R^1{}_2ESi-$, $R^1E_2Si-$, $RR^1ESi-$, $R_2GSi-$, $RG_2Si-$, $G_3Si-$, $R^1{}_2GSi-$, $R^1G_2Si-$, $RR^1GSi-$, $REGSi-$, $E_2GSi-$, $G_2ESi-$, and $R^1EGSi-$, in which R, $R^1$, E and G are defined above;
y is zero or a number having a value of up to about 200;
w is zero or a number having a value of up to about 200-y;
x is zero or a number having a value of up to about 185;
z is zero or a number having a value of up to about 135; and
q is a number having a value of 1 to about 75;
with the proviso that the epoxypolysiloxane comprises at least one G group and one E group, the ratio of G to E groups is from about 1:10 to 2:1, and the total number of E and G groups is about 5 to 50% of the total number of siloxane units.

The composite structures of the invention desirably exhibit release values which can range from very low values to relatively high values depending upon the content and nature of epoxy functionalities. At the same time, the composite structures are convenient to manufacture since the release coatings exhibit relatively rapid rates of cure. The ability to desirably vary the release level is achieved via the presence of linear or branched aliphatic epoxy functionality. Inclusion of cycloaliphatic epoxy functionality provides for the relatively rapid rate of cure of the release coatings. Hence the present invention represents a significant advance over prior art release coatings prepared from an epoxypolysiloxane containing only linear or branched aliphatic epoxy substitution or only cycloaliphatic epoxy substitution.

DETAILED DESCRIPTION OF THE INVENTION

The curable epoxypolysiloxanes useful in the coating compositions for providing the release layer of the invention can be fluids or much higher molecular weight greases or gums, and they can be cured with many types of epoxy curing catalysts well-known in the art in conjunction with actinic radiation and/or heat. Although fluids having average molecular weights ranging from about 1,000 to 20,000 are preferred because of handling performance and versatility of application, e.g., 100% solids or solution coatings can be used, compounds and polymers having molecular weights to $1.5 \times 10^6$ or more can be used, especially as solution coatings. Generally, the very high molecular weight polymers are less convenient to use because of their high solution viscosities: A further disadvantage is that they can exhibit lower pot life when mixed in solution with some of the more active catalysts. Viscosities of the epoxypolysiloxane ranging from about 50 to 3,000 centipoise, measured at 23° C. using a Brookfield viscometer are preferred.

The present invention contemplates the use of one or more epoxypolysiloxanes which provide one or more cycloaliphatic epoxy groups and one or more non-cycloaliphatic epoxy groups (i.e., linear or branched aliphatic epoxy groups). In the event that a single epoxypolysiloxane is used, it will comprise both types of epoxy groups. Where two or more epoxypolysiloxanes are used, one epoxypolysiloxane may, if desired, comprise only cycloaliphatic epoxy groups, and another epoxypolysiloxane may, if desired, comprise only non-cycloaliphatic expoxy groups.

Preferred release coatings are prepared from starting materials wherein the ratio of the total number of cycloaliphatic epoxy groups to the total number of non-cycloaliphatic epoxy groups is from about 1:8 to 1:1, and the total number of cycloaliphatic and non-cycloaliphatic epoxy groups is about 10 to 40% of the total number of siloxane units. Most preferred release coatings are prepared from starting materials wherein the ratio of the total number of cycloaliphatic epoxy groups to the total number of non-cycloaliphatic epoxy groups is from about 1:5 to 2:3, and the total number of the cycloaliphatic and non-cycloaliphatic epoxy groups is about 10 to 35% of the total number of siloxane units.

Preferred mixed epoxypolysiloxanes comprising both cycloaliphatic and non-cycloaliphatic epoxy groups are of general Formula I above.

Preferred epoxypolysiloxanes which comprise only cycloaliphatic epoxy groups and are for use with an epoxypolysiloxane comprising non-cycloaliphatic groups are of general Formula II below.

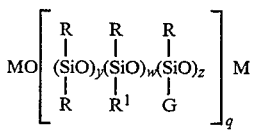

wherein R is a lower alkyl group having one to three carbon atoms, $R^1$ is a monovalent hydrocarbon group of 4 to 20 carbon atoms;

G is a monovalent cycloaliphatic epoxy group;

M is a silyl group selected from $R_3Si—$, $R_2R^1Si—$, $RR^1{}_2Si—$, $R^1{}_3Si—$, $R_2GSi—$, $RG_2Si—$, $G_3Si—$, $R^1{}_2GSi—$, $R^1G_2Si—$ and $RR^1GSi—$, in which R, $R^1$, and G are defined above;

y is zero or a number having a value up to about 200;

w is zero or a number having a value up to about 200-y;

z is zero or a number having a value up to about 200; and q is a number having a value of 1 to about 75;

with the proviso that the epoxypolysiloxane comprises at least one G group.

Preferred epoxypolysiloxanes which comprise only non-cyclic aliphatic epoxy groups and are for use with an epoxypolysiloxane comprising cycloaliphatic groups (such as an epoxypolysiloxane of Formula II above) are of the general Formula III below:

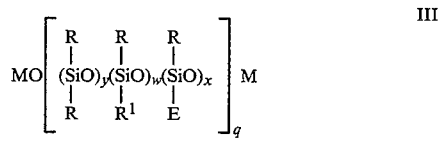

wherein R is a lower alkyl group having one to three carbon atoms, $R^1$ is a monovalent hydrocarbon group of 4 to 20 carbon atoms;

E is a monovalent linear or branched aliphatic epoxy group;

M is a silyl group selected from $R_3Si—$, $R_2R^1Si—$, $RR^1{}_2Si—$ $R^1{}_3Si—$, $R_2ESi—$, $RE_2Si—$, $E_3Si—$, $R^1{}_2ESi—$, $R^1E_2Si—$, and $RR^1ESi—$, in which R, $R^1$, and E are defined above;

y is zero or a number having a value up to about 200;

w is zero or a number having a value up to about 200-y;

x is zero or a number having a value up to about 200; and q is a number having a value of 1 to about 75; with the proviso that the epoxypolysiloxane comprises at least one E group.

Epoxypolysiloxanes of Formulas II and III above are selected and used in amounts such that the ratio of the total number of G to E groups is from about 1:10 to 2:1, and the total number of E and G groups is about 5 to 50% of the total number of siloxane units contained in both epoxypolysiloxanes. More preferably, the ratio of G to E groups is from about 1:8 to 1:1, and the total number of E and G groups is about 10 to 40% of the total number of siloxane units. Most preferably, the ratio of the total number of G toe groups is from about 1:5 to 2:3, and the total number of E and G groups is about 10 to 35% of the total number of siloxane units.

Illustrative examples of the monovalent hydrocarbon group, $R^1$, in the above Formulas I, II, and III (and Formula IV below) are alkyl groups such as butyl, isobutyl, tert-butyl, hexyl, octyl and octadecyl; aryl groups such as phenyl, naphthyl and bisphenyl; alkaryl groups such as tolyl and xylyl; aralkyl groups such as phenylmethyl, phenylethyl, phenylpropyl and phenylhexyl; and cycloaliphatic groups such as cyclopentyl, cyclohexyl and 3-cyclohexylpropyl; and ether oxygen- or ester oxygen-containing groups such as ethoxypropyl, butoxybutyl, and ethoxycarbonylpropyl and the like.

The various siloxane units (whether substituted by R, $R^1$, E or G) in Formulas I, II, III and IV may be ordered or randomly arranged in the epoxypolysiloxane.

The epoxypolysiloxanes of Formulas I, II and III can be prepared by many methods known in the art such as the chloroplatinic acid catalyzed addition reaction of hydride functional siloxanes with aliphatically unsaturated epoxy compounds, or the epoxidation of vinyl or like unsaturated siloxanes and Grignard type reactions as for example described by E. P. Plueddemann and G. Fanger, *J. Am. Chem. Soc.* 81, 2632–35 (1959). A convenient method is the hydrosiloxane addition reaction of unsaturated aliphatic epoxy compounds with hydride-functional silicone oligomers. When this method is used, it is preferred that essentially complete reaction of the SiH sites are accomplished although small amounts of hydrogen attached to silicon can be present. It is also preferred for beast results that the epoxypolysiloxane is ,essentially free from low molecular weight components such as cyclic siloxanes since their presence in the final cured coating could adversely affect the adhesion property of the adhesive (resulting in adhesive loss or buildup).

Representative examples of non-cyclic unsaturated aliphatic epoxy compounds that can be used in the preparation of the epoxypolysiloxanes include the following:

$$H_2C\overset{O}{\overset{}{\diagdown\diagup}}CH{-}(CH_2{-}CH_2)_{\overline{f}}CH{=}CH_2$$

in which f is 1 to 300

$$H_2C\overset{O}{\overset{}{\diagdown\diagup}}CH{-}(OCH_2CH_2)_{\overline{f}}CH{=}CH_2$$

in which f is 1 to 300

$$H_2C\overset{O}{\overset{}{\diagdown\diagup}}CH{-}CH{=}CH_2$$

3,4-epoxybutene (or vinyloxirane)

$$H_2C\overset{O}{\overset{}{\diagdown\diagup}}CHCH_2{-}CH{=}CH_2$$

4,5-epoxy-1-pentene (or allyloxirane)

$$H_2C\overset{O}{\overset{}{\diagdown\diagup}}CHCH_2CH_2{-}CH{=}CH_2$$

5,6-epoxy-1-hexene (or 4-butenyloxirane)

$$H_2C\overset{O}{\overset{}{\diagdown\diagup}}\underset{\underset{CH_3}{|}}{C}{-}CH{=}CH_2$$

3,4-epoxy-3-methyl-1-butene (or 2-methyl-2-vinyloxirane)

$$H_2C\overset{O}{\overset{}{\diagdown\diagup}}\underset{\underset{CH_3}{|}}{C}{-}\underset{\underset{CH_3}{|}}{C}{=}CH_2$$

3,4-epoxy-2,3-dimethyl-1-butene (2-methyl-2-isopropenyl-oxirane)

$$H_2C\overset{O}{\overset{}{\diagdown\diagup}}CH{-}O{-}CH{=}CH_2$$

4,5-epoxy-3-oxa-1-pentene or (ethenyloxyoxirane or oxiranyl vinyl ether)

$$H_2C\overset{O}{\overset{}{\diagdown\diagup}}\underset{\underset{CH_3}{|}}{C}{-}O{-}\underset{\underset{CH_3}{|}}{C}{=}CH_2$$

4,5-epoxy-2,4-dimethyl-3-oxa-1-pentene (or 2-methyl-2-isopropenyl-oxirane)

$$H_2C\overset{O}{\overset{}{\diagdown\diagup}}CHCH_2{-}O{-}CH_2{-}CH{=}CH_2$$

6,7-epoxy-4-oxa-1-hepene (or 4-oxaprop-4-enyloxirane or 3-glycidyloxypropene or allyl glycidyl ether)

$$H_2C\overset{O}{\overset{}{\diagdown\diagup}}CH{-}O{-}CH_2CH_2{-}O{-}CH{=}CH_2$$

$$H_2C\overset{O}{\overset{}{\diagdown\diagup}}CH{-}O{-}(CH_2)_{\overline{5}}CH{=}CH_2$$

7,8-epoxy-3,6-dioxa-1-octene (or 3,6-dioxahex-5-enyloxyoxirane or oxiranyl 3-oxapent-5-enyl ether)

$$H_2C\overset{O}{\overset{}{\diagdown\diagup}}CHCH_2{-}O{-}CH_2CH_2CH_2{-}O{-}CH{=}CH_2, \text{ and}$$

10-11-epoxy-4,8-dioxa-1-undecene.

Representative examples of cycloaliphatic epoxy compounds that .can be used in the preparation of the epoxypolysiloxanes include the following:

4-vinyl cyclohexene oxide limonene monooxide
vinylnorbornenemonoxide
dicyclopentadienemonoxide Preferred hydride-functional silicone oligomers for use in the preparation of the epoxypolysiloxanes are the hydride-functional silicone oligomers having the general Formula IV

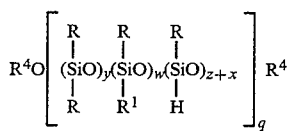

IV wherein
R, $R^1$, w, x, y, z, and q are the same as defined in Formula I and
$R^4$ is a silyl group selected from $R_3Si-$, $R_2R^1Si-$, $RR^1{}_2Si-$, $R_2HSi-$, $RH_2Si-$, $H_3Si-$, $R^1H_2Si-$, $R^1{}_2HSi-$, $RR^1HSi-$, and $R^1{}_3Si-$, in which R and $R^1$ are defined above.

The hydrosiloxanes are well known and are generally prepared, for example, by the equilibration of a mixture of polyhydromethylsiloxane (available from Dow Corning as DC ™ 1107) and octamethylcyclotetrasiloxane (commonly designated $D_4$ and available from Dow Corning), with or without up to 20% of other alkylpolysiloxanes, and hexamethyldisiloxane or other hexalkyldisiloxanes in the presence of a strong mineral acid. By varying the ratios and nature of the siloxanes in the mixture, the range of hydrosiloxanes within the definition of Formula IV can be prepared.

Curing of the epoxypolysiloxane-containing compositions of this invention can be effected by mixing with conventional cationic epoxy curing catalysts activated by actinic radiation and/or heat. Catalysts activated by actinic radiation are preferred. Examples of suitable photoinitiators are onium salts of a complex halogen acid, particularly the polyaromatic iodonium and sulfonium complex salts having $SbF_6$, $SbF_5OH$, $PF_6$, $BF_4$, or $AsF_6$ anions, as are disclosed in U.S. Pat. No 4,101,513, incorporated herein by reference. Preferred photoinitiators are the iodonium and sulfonium salts most preferably having the $SbF_6$ anion. Also useful photoinitiators are organometallic complex salts which are disclosed in U.S. Pat. No. 5,089,536, and supported photoinitiators for the actinic radiation activated polymerization of cationically-polymerizable compounds described in U.S. Pat. No. 4,677,137, both of which are incorporated herein by reference.

The amount of photoinitiator useful to provide release coatings can range from about one to five percent by weight of the total weight of the epoxypolysiloxane(s). A supported photoinitiator, which may contain 0.005 to 5 parts by weight of onium salt photoinitiator per part of support material, can be used in an amount from about 0.005 to 20 parts, preferably 1.0 to 10 parts per 100 parts of total epoxypolysiloxane(s).

Suitable ultraviolet radiation for curing coatings of the controllable release composition can be obtained from both high and medium pressure mercury vapor lamps, black light lamps, and the like. Exposure necessary to effect the cure depends on the concentration of photoinitiator, the particular polyepoxypolysiloxane(s) employed, the thickness of the composition, and the wavelength of the ultraviolet radiation (wavelengths of 200 to 400 nm are preferred although by including select spectral sensitizers, wavelengths up to about 600 nm can be used). Generally, the exposure time ranges from about 0.1 second or less to about 10 minutes. Useful sensitizers include 2-isopropylthioxanthone, 1,3-diphenyl-2-pyrazoline, and 1,3-diphenylisobenzofuran. Other useful sensitizers are disclosed in U.S. Pat. No. 4,250,053, which is incorporated herein by reference. Effective amount of spectral sensitizer can be in the range of 0.01 to 10 parts, preferably about 0.05 to 1.0 parts per part of photoinitiator.

Suitable heat-activated cationic catalysts which may be used include the heat-activated sulfonic and sulfonylic catalysts described in U.S. Pat. No. 4,313,988, incorporated herein by reference.

Heat-activated cationic catalysts will generally be used in an amount of about 1 to 5 parts by weight per 100 parts of the total epoxypolysiloxane(s).

In the practice of the invention, the epoxypolysiloxane and the catalyst, are mixed and, when needed to provide a viscosity suitable for coating, an organic solvent added. The composition is coated onto the substrate and exposed to 0.05 to about 1.5 joules per square centimeter of actinic radiation in the case where the catalyst is a photoinitiator. It is sometimes desirable to apply heat during or after the irradiation. Application of radiation followed by heating is also known, in the art, as two-stage curing.

In the case where the catalyst is heatactivated, the coating generally is heated to 25° C. to 150° C.

Solvents can be used include ethyl acetate, isopropyl acetate, acetone,, methyl ethyl ketone, heptane, toluene, and mixtures thereof. The exact coating technique is not especially critical and any of several well known procedures can be used. Wirewound rods, such as a Meyer bar, or a rotogravure applicator roll having, for example, 80 lines per cm, provide uniform coatings. Optionally, a mixing spray nozzle having a line for the epoxypolysiloxane fluid or solution and a separate line for the catalyst solution can be used.

Substrates to which the release layer of the invention can be applied include organic substrates of wood, fiberboard, particle board, paper and cardboard; woven and non-woven organic and inorganic fibers; synthetic and natural polymers such as polyolefins, polyesters, polyamides, cured phenolics, urea-aldehyde resins, poly(vinyl halides), polyacrylates, polyurethanes, proteins, rubber; inorganic substrates which include metals such as iron, stainless steel, copper, brass, bronze aluminum, titanium, nickel, zinc, and alloys.

The solventless actinic radiation-curable compositions of the invention are particularly suitable for preparing release liners of use with adhesive roll and sheet materials. For this use, a substrate of paper or a film of polymer such as, for example, polyester, polyamide, polyolefin, etc. is used as the tape backing.

One or both surfaces of the substrate of the composites of the invention may bear a layer of release coating. Where both surfaces bear a coating, the coating may be the same on both surfaces or may be different thereby resulting in one coating having a release value towards an adhesive different from the other coating (i.e., to provide a differential release liner).

The initial release performance of the epoxypolysiloxane coating toward adhesives can be measured by various methods known in the art depending upon whether the final product is in sheet or rolled form such as a tape. Various test methods for pressure-sensitive tapes are reported by the Pressure Sensitive Tape Council (PSTC), "Test Methods for Pressure Sensitive Tapes" (several editions).

Objects and advantages of this invention are further illustrated by the following examples, but the particular materials and amounts thereof recited in these examples, as well as other conditions and details, should not be construed to unduly limit this invention. All amounts are expressed as amounts by weight unless otherwise indicated.

Coating Release Materials

The release materials in the following examples were formulated with photoinitiator and coated onto 50 micron thick biaxially oriented polypropylene on a five smooth roll coater. The thickness of the coated release materials produced was between 0.5 and 1.0 micron. After coating, the layers were photopolymerized by passing them under a medium pressure mercury ultraviolet lamp to give dry, tack-free coatings.

Cure Rate Measurements

Cure rates of the release materials in the following examples were measured by coating the materials as described above, and passing the coating through an RPC UV processor with one medium pressure UV lamp running at 120 watts/2.54 cm. Cure rate was defined as the maximum speed at which the coatings could be passed through the UV processor such that the cured coating did not detackify a 2.54 cm wide strip of Scotch® 610 brand tape which was firmly pressed onto the coating within 15 seconds of leaving the processor.

Release Values

Release values of the coatings in the following examples were measured by coating an acrylic pressure sensitive adhesive, i.e., a 95.5:4.5 isooctyl acrylate-acrylic acid copolymer as described in U.S. Pat. No. RE 24,906, directly onto the release coating using heptane as solvent. After coating, the adhesive was dried in an oven at 70° C. for 5 minutes, and a 50 micron thick polyester film was laminated to the adhesive layer. This laminate was heated in an oven at 70° C. for 72 hours. The aged laminate was cut into 2.5×25 cm strips and attached, substrate side down, to a glass plate using double stick tape. The release value is the force, in grams, required to pull the polyester film with the pressure sensitive adhesive adhered thereto, away from the release coated substrate at an angle of 180° and a pulling rate of 230 cm/minute.

EXAMPLES 1-6

Mixed epoxysilicones of the present invention having the average structure of:

Me$_3$Si(OSiMe$_2$)$_a$(OSi[E]Me)$_b$(OSi[G]Me)$_c$OSiMe$_3$ where E is a linear or branched aliphatic epoxy substituent, G is a cycloaliphatic epoxy substituent, and a, b and c are integers indicated in the various Examples, were prepared in the following manner:

A hydride functional silicone oligomer used in Example i was prepared by the equilibration of a mixture of polyhydrogenmethyl siloxane (97.10 g, 1.50 equivalents of CH$_3$HSiO, available as DC 1107 ™ from Dow Corning), octamethylcyclotetrasiloxane ( 1000 g, 13.49 equivalents of (CH$_3$)$_2$SiO) and hexamethyldisiloxane (41.76 g, 0.257 moles). This mixture was shaken with concentrated sulfuric acid (1.11 g) and activated carbon black (5.60 g) at room temperature for 2 days, followed by filtration and removal of volatiles under high vacuum at 200° C. The product obtained was a clear, colorless liquid with a measured Si—H equivalent weight of 760 grams/equivalent.

The silicone oligomer prepared above (841.1 g, 1.107 equivalents of Si—H), 4-vinyl cyclohexene oxide (55.19 g, 0.444 moles, available from Union Carbide Corp.), and hexane (992 g) were placed in a 3 liter, 3-neck flask equipped with a condenser, mechanical stirrer, thermometer, addition funnel, and rubber septum and the reaction mixture was heated to 70° C. under a nitrogen atmosphere. A solution of 0.1024 g of 15% platinum in divinyl tetramethyldisiloxane in 3.0 ml hexane was added at approximately 1.5 ml/hour through the rubber septum with a syringe pump. After one hour, allyl glycidyl ether (95.1 g, 0.833 moles, available from Aldrich Chemical Co.) was added to the reaction, and the reaction was stirred at 70° C. for an additional hour, at which time addition of the platinum catalyst solution was complete. After cooling, the solvent and excess allyl glycidyl ether were removed under reduced pressure, and the last traces of volatiles were removed by heating at 80° C./0.1 mm Hg for two hours. The product was a clear straw-colored liquid having a measured epoxy equivalent weight of 886 grams/equivalent.

A release coating of this mixed epoxysilicone was prepared by mixing the epoxysilicone (95 parts) with bis-(dodecylphenyl)iodonium hexafluoroantimonate, (2 parts), dodecanol (3 parts), and 2-isopropylthioxanthone (0.2 parts). This formulation was coated and cured as described above to give a tack free rubbery coating which gave a release value of 7 grams/2.5 cm when tested with the acrylic adhesive as described above.

The mixed epoxysilicones (Examples 2-6) indicated in Table 1 were prepared from the corresponding hydride functional silicones which had been prepared by changing the ratios of the three siloxane starting materials, but otherwise following the procedures described above in connection with Example 1. Release coatings were then prepared, coated, and cured also as described above. Table 1 also lists the release values which were obtained against an acrylic pressure-sensitive adhesive.

TABLE 1

| Example | EEW | a | b | c | Release (g/2.5 cm) |
| --- | --- | --- | --- | --- | --- |
| 1 | 886 | 45 | 3 | 2 | 7 |
| 2 | 667 | 43 | 5 | 2 | 24 |
| 3 | 510 | 41 | 7 | 2 | 26 |
| 4 | 474 | 40 | 8 | 2 | 36 |
| 5 | 441 | 39 | 9 | 2 | 82 |
| 6 | 339 | 34 | 14 | 2 | 334 |

The utility of this invention for applications requiring the lowest possible release force was demonstrated in the following series of experiments.

COMPARATIVE EXAMPLES A & B

Two epoxysilicone polymers without mixed epoxy functionality were prepared in a similar manner to Example 1 using allyl glycidyl ether (Comparative Example A), or 4-vinyl cyclohexene oxide (Comparative Example B). The epoxysilicone polymers were formulated, coated, cured and evaluated as described in Example 1. Table 2 reports the release values and cure rates for the cured epoxysilicones.

EXAMPLE 7

A mixed epoxysilicone coating was prepared by crosslinking a mixture of the polymer of Comparative Example A and the polymer of Comparative Example B in a 3/2 ratio. Release values and cure rates for the mixtures are also reported in Table 2.

EXAMPLE 8

A mixed epoxysilicone coating was prepared by crosslinking a mixture of the polymer of Comparative Example A and the polymer of Comparative Example B in a 4/1 ratio. Release values and cure rates for the mixtures are also reported in Table 2.

TABLE 2

| Example | EEW | a | b | c | Release (g/2.5 cm) | Cure Rate (meters/min) |
|---|---|---|---|---|---|---|
| 1 | 886 | 45 | 3 | 2 | 7 | 115 |
| Comp. A | 865 | 45 | 5 | 0 | 7 | 9 |
| Comp. B | 900 | 45 | 0 | 5 | 14 | 180 |
| 7 | — | — | — | — | 7 | 80 |
| 8 | — | — | — | — | 6 | 70 |

As shown in Table 2, coatings which contain both cycloaliphatic and linear or branched aliphatic epoxy substituents exhibit cure rates much faster than the non-cylcoaliphatic material (A) but maintain desirable low levels of release.

The utility of this invention for applications which require a moderate release level (as in, for example, a differential liner) can be shown in the following series of experiments.

COMPARATIVE EXAMPLES C & D

Comparative Examples C and D were prepared in a manner similar to Example 3, except that Comparative Example C contained only allyl glycidyl ether and Comparative Example D contained only 4-vinyl cyclohexene oxide. Release values and cure rates for these materials are reported in Table 3.

EXAMPLE 9

A mixed epoxysilicone coating was prepared by crosslinking a mixture of a polymer of Comparative Example C and a polymer of Comparative Example D in a 7/2 ratio according to the procedure of Example 3. Release values and cure rates for the crosslinked mixture is reported in Table 3.

Example 9 shows that inclusion of both cycloaliphatic and non-cycloaliphatic functionalities in the release coatings results in an accelerated cure relative to the non-cycloaliphatic material, but maintains the desired release value for a differential tape release liner.

TABLE 3

| Example | EEW | a | b | c | Release (g/2.5 cm) | Cure Rate (meters/min) |
|---|---|---|---|---|---|---|
| 3 | 510 | 41 | 7 | 2 | 30 | 95 |
| Comp. C | 530 | 41 | 9 | 0 | 25 | 18 |
| Comp. D | 521 | 41 | 0 | 9 | 88 | 210 |
| 9 | — | — | — | — | 30 | 88 |

The utility of this invention in applications which require a tight release level (as in, for example, a tape low adhesion backsize) can be shown in the following set of experiments.

COMPARATIVE EXAMPLES E-F

Comparative Examples E and F was prepared in a manner similar to Example 6, except that Comparative Example E contained only allyl glycidyl ether and Comparative Example F contained only 4-vinyl cyclohexene oxide. It was .impossible to prepare coatings of the polymer of Comparative Example F as its reactivity was so high that it immediately gelled on addition of the iodonium catalyst. Release values and cure rate data for the Comparative Examples are reported in Table 4.

EXAMPLE 10

A mixed epoxysilicone coating was prepared by crosslinking a mixture (2/1) of the polymers of Comparative Example E and Comparative Example F according to the procedure of Example 6. Release values and cure rates for the crosslinked mixture is reported in Table 4.

EXAMPLE 11

A mixed epoxysilicone coating was prepared by crosslinking a mixture (4/1) of the polymers of Comparative Example E and Comparative Example F according to the procedure of Example 6. Release values and cure rates for the crosslinked mixture is reported in Table 4.

TABLE 4

| Example | EEW | a | b | c | Release (g/2.5 cm) | Cure Rate (meters/min) |
|---|---|---|---|---|---|---|
| 6 | 339 | 34 | 14 | 2 | 334 | 168 |
| Comp. E | 330 | 34 | 16 | 0 | 176 | 55 |
| Comp. F | 332 | 34 | 0 | 16 | * | * |
| 10 | — | — | — | — | 266 | 168 |
| 11 | — | — | — | — | 191 | 152 |

*Material gelled on addition of the catalyst

Examples 10-11 show that the mixed functionality system is preferable to the cycloaliphatic system for release materials having high functionality levels.

We claim:

1. A composite structure comprising a substrate bearing on one or more surfaces a layer comprising the reaction product of a starting material comprising one or more epoxypolysiloxanes individually or together providing cycloaliphatic and non-cycloaliphatic epoxy groups in a total number which is about 5 to 50% of the total number of siloxane units, the ratio of total number of cycloaliphatic epoxy groups to total number of non-cycloaliphatic epoxy groups being from about 1:10 to 2:1, said epoxypolysiloxane(s) being cured in the presence of a catalytically effective amount of a cationic epoxy curing catalyst.

2. A composite structure according to claim 1, wherein said starting material comprises an epoxypolysiloxane containing said cycloaliphatic and non-cycloaliphatic epoxy groups in the same molecule.

3. A composite structure according to claim 1, wherein said starting material comprises two or more epoxypolysiloxanes, one epoxypolysiloxane comprising only said cycloaliphatic epoxy groups and another epoxypolysiloxane comprising only said non-cycloaliphatic epoxy groups.

4. A composite structure according to claim 1, wherein said starting material comprises two or more epoxypolysiloxanes, one epoxypolysiloxane comprising only one or more cycloaliphatic epoxy groups or only one or more non-cycloaliphatic epoxy groups, and another epoxypolysiloxane comprising both cycloaliphatic and non-cycloaliphatic epoxy groups.

5. A composite structure according to claim 1, wherein the ratio of the total number of said cycloaliphatic epoxy groups to the total number of said non-cycloaliphatic epoxy groups is from about 1:8 to 1:1, and the total number of said cycloaliphatic and non-cycloaliphatic epoxy groups is about 10 to 40% of the total number of siloxane units.

6. A composite structure according to claim 1, wherein the ratio of the total number of said cycloaliphatic epoxy groups to the total number of said non-cycloaliphatic epoxy groups is from about 1:5 to 2:3, and the total number of said cycloaliphatic and non-cycloaliphatic epoxy groups is about 10 to 35% of the total number of siloxane units.

7. A composite structure according to claim 1, wherein said cycloaliphatic epoxy group is derived from 4-vinyl cyclohexeneoxide.

8. A composite structure according to claim 1, wherein said non-cycloaliphatic epoxy group is derived from allyl glycidyl ether.

9. A composite structure according to claim 1, wherein said cycloaliphatic epoxy group is derived from 4-vinyl cyclohexeneoxide and said non-cycloaliphatic epoxy group is derived from allyl glycidyl ether.

10. A composite structure according to claim 1, which is a release liner.

11. A composite structure according to claim 1, which is a differential release liner.

12. A composite structure according to claim 1, further comprising a layer of adhesive.

13. A composite structure according to claim 12, wherein said adhesive is a pressure-sensitive adhesive.

14. A composite structure comprising a substrate bearing on a surface thereof a first layer comprising the reaction product of a starting material comprising one or more epoxypolysiloxanes individually or together providing cycloaliphatic and non-cycloaliphatic epoxy groups in a total number which is about 5 to 50% of the total number of siloxane units, said first layer being cured in the presence of a catalytically effective amount of a cationic curing catalyst, the surface of said first layer opposite said substrate further having in contact therewith a second layer comprising an adhesive said first layer curing faster than if said starting material comprised none of said cycloaliphatic epoxy groups, and said first layer exhibiting a lower release value to said second layer than if said starting material comprised none of said non-cycloaliphatic epoxy groups.

* * * * *

UNITED STATES PATENT AND TRADEMARK OFFICE
CERTIFICATE OF CORRECTION

PATENT NO. : 5,409,773
DATED : April 25, 1995
INVENTOR(S) : Kessel et al.

It is certified that error appears in the above-indentified patent and that said Letters Patent is hereby corrected as shown below:

| | |
|---|---|
| Col. 1, line 58 | "about ! 5 to 50%" should be —about 5 to 50%— |
| Col. 4, line 51 | "G toe groups" should be —G to E groups— |
| Col. 5, line 15 | "beast results" should be —best results— |
| Col. 5, line 16 | ",essentially" should be —essentially— |
| Col. 10, line 12 | ",which time" should be —which time— |

Signed and Sealed this

Thirty-first Day of October 1995

Attest:

BRUCE LEHMAN

Attesting Officer     Commissioner of Patents and Trademarks